United States Patent Office 2,806,511
Patented Sept. 17, 1957

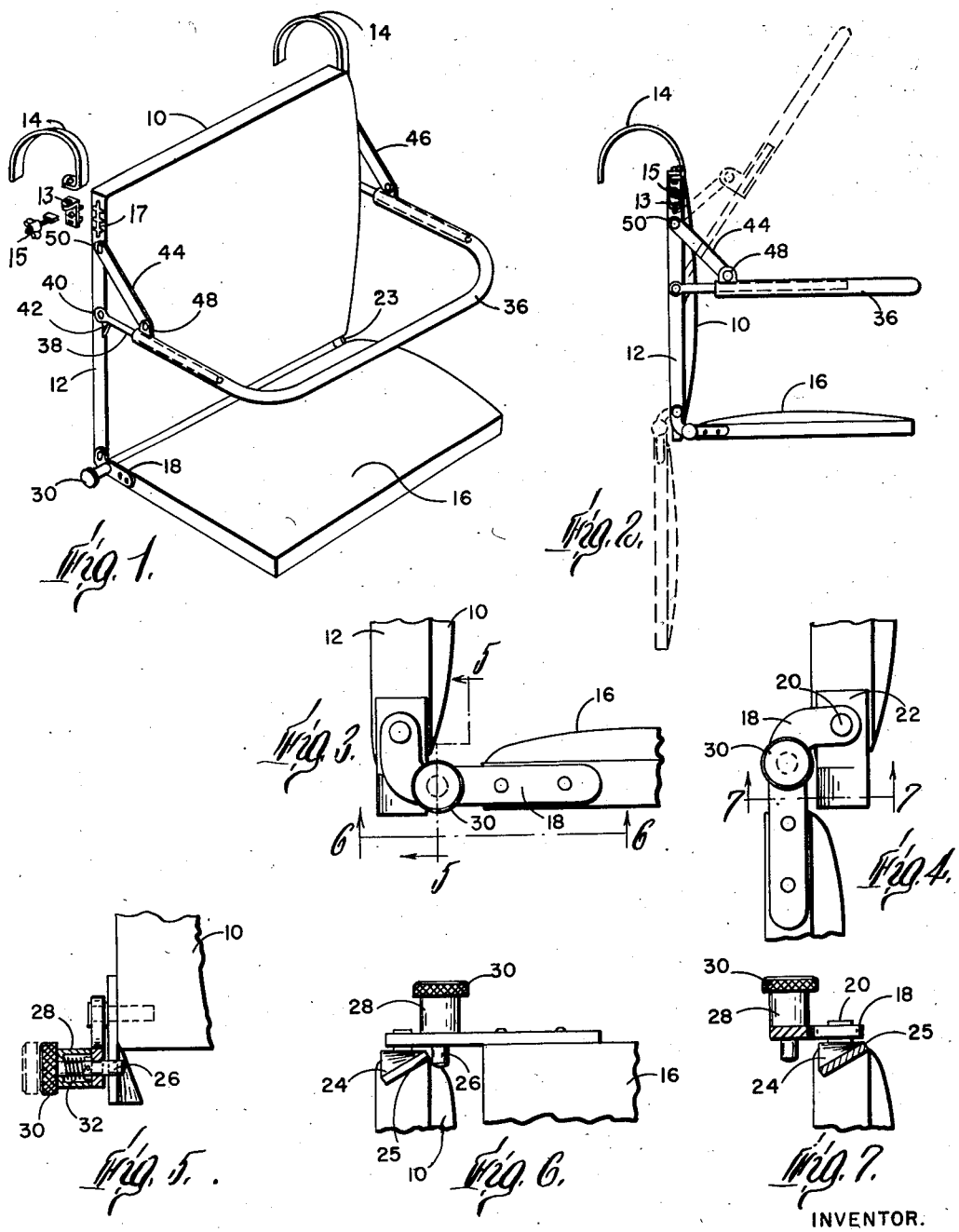

2,806,511

CHILD'S CAR SEAT

Morris C. Merelis, Brookline, Mass., assignor to Rose-Derry Company, Newton, Mass., a corporation of Massachusetts Application June 21, 1955, Serial No. 516,918

5 Claims. (Cl. 155—11)

The present invention relates to a child's car seat.

It is a principal object of the present invention to provide an improved child's car seat which is readily collapsible into a convenient form for carrying and storage, and which is most conveniently arranged for holding in and for releasing a child from the seat.

In accordance with the invention a child's seat is provided with a back portion having a pair of hooks from which the seat is suspended, a hinged seat which is adapted to be swung upwardly into the operative position and which is then locked in this position through the operation of a cooperating spring detent and cam locking element, and a U-shaped fence which is mounted on telescoping hinge members, and which is further controlled by a pair of links connected between the U-shaped fence and the back portion of the seat, said links having a pivotal connection with said back portion substantially above the telescoping hinge members, so that the fence, when swung upwardly, will also move outwardly and up over the head of a child in the seat.

The several features of the invention will be readily understood by one skilled in the art from the following description taken in connection with the accompanying drawings in which:

Fig. 1 is an isometric view of a child's car seat embodying several features of the invention;

Fig. 2 is a side view of the seat looking from the left with the seat and fence portions in operative positions, these parts being shown in dotted lines respectively in their folding positions;

Fig. 3 is an enlarged fragmentary view of the seat hinge in left side elevation with the seat shown in its operating position;

Fig. 4 is a view similar to Fig. 3 but with the parts being shown in a down inoperative position;

Fig. 5 is a sectional view taken on a line 5—5 of Fig. 3;

Fig. 6 is a fragmentary plan view of substantially the parts shown in Fig. 3 looking from beneath shown by the line 6—6 in Fig. 3; and Fig. 7 is a sectional view taken on a line 7—7 of Fig. 4.

As shown in the drawings, the child's seat comprises a back portion 10 having at each side thereof two uprights 12. At the upper ends of each upright 12 there is provided a large rearwardly disposed hook member 14. These hooks are arranged to be placed over the back cushion on an automobile seat from which the child's car seat is suspended. A seat portion 16 is hinged to the back portion 10 to be swung between a forwardly projecting operative position as shown, for example, in full lines in Fig. 2, and a dropped inoperative position as shown in dotted lines in Fig. 2.

Each hook member 14 is formed of flat stock, and at its lower shank end is bent at right angles to form a tab which fits under a similar tab on a bracket 13 adjustably secured by a bolt and wing nut 15 in a slot 17 formed in the upright 12. The two tabs are pinned together to form a swivel joint on which the hook 14 can be swung from the rearward cushion engaging position shown in Figs. 1 and 2 to a lateral folded position. Each bracket 13 is formed with two inwardly extending transverse ridges which fit into the upper and lower of three adjacent cross slots forming part of slot 17 to hold the bracket in any desired position of adjustment corresponding with the adjustment desired in the vertical position of the seat 16. The bolt provided with the wing nut 15 has a flat head which is inserted through the middle of the three cross slots and is then turned to a diagonal locking position causing the bracket 13 and upright 12 to be clamped securely together as the wing nut is tightened.

The mechanism by means of which the seat portion 16 is hinged to the back portion 12 and is releasably held in its operative position, as best shown in Figs. 3–7 inclusive, consists of a pair of right angled hinge brackets 18 which are secured respectively to each rear corner of the seat 16 and which are arranged to turn on pivots 20 carried on cooperating brackets 22 and 23 secured to the lower ends of the uprights 12 of the back portion 10. The bracket 22 at its lower end is twisted to provide a cam riser 24 and at the end thereof a stop surface 25. On the cooperating bracket 18 there is provided a spring pressed detent 26, which is slidably mounted in a cylindrical casing 28 attached to the bracket 18 and is provided at its outer end with an enlarged knurled head 30. A small spring 32 coiled about the detent 26 and fitted about the collar of the detent and casing 28 serves normally to maintain the detent in an inwardly projecting position in the path of the cam 24 and locking surface 25. Movement of the seat portion 16 from the dotted to the full line position shown in Fig. 2 causes the detent 26, riding on the cam surface 24, to be retracted and thereafter to be released to the locking position shown specifically in Fig. 6.

In accordance with the invention a tubular U-shaped fence member 36 is provided which is carried on two hinge members 38 which extend within the ends of the tubular fence member 36 in telescoping relation thereto, and are hinged at 40 to respective uprights 12. A lug 42 formed on each hinge member 38 is arranged to engage the upright 12 in the horizontal position of the hinge member to prevent further downward movement thereof. The U-shaped fence is further supported and controlled by means of two links 44 and 46 which are identical in construction. Link 44 is pivoted to a lug 48 formed around the U-shaped fence 36 and at its other end is pivoted at 50 to the upright 12 at a point substantially above the pivot 40 for the hinge member 38. With this arrangement of the parts it will readily be appreciated that an upward swinging movement of the U-shaped fence about the pivot 40 of the hinge member 38 at the same time through the action of links 44 causes the fence to move outwardly and with relation to the hinge member 38 so that the front edge of the fence will move roughly in a vertical direction until it is above the head of a child supported on the seat, and thereafter in a rearward direction to its fully raised inoperative position.

The invention having been described what is claimed is:

1. A child's car seat having, in combination, a back portion, a seat portion mounted from the back portion, supporting means on which the child's car seat is carried in position for use, a U-shaped fence having a cross bar and rearwardly extending tubular extensions, hinge members pivotally supported from the back portion and arranged to extend within said tubular extensions in telescoping relation thereto, and a pair of links connected between said U-shaped fence and the back portion, said links having a pivotal connection with the back portion substantially above the pivots of said hinge members whereby an upward swinging movement of the fence will simultaneously move the fence outwardly on said hinge members.

2. A child's car seat having, in combination, a back portion, a pair of hooks for suspending said car seat secured to the back portion, a seat portion mounted from the back portion, a U-shaped fence having a cross bar and rearward extensions, hinge members pivotally mounted from the back portion having a telescoping connection with the rearward extensions of said U-shaped fence, cooperating abutments on at least one hinge member and back portion arranged to limit downward movement of the hinge members and fence to a horizontally outwardly projecting position from said back portion, and a pair of links connected between said U-shaped fence and said back portion, said links having a pivotal connection with the back portion substantially above the telescoping hinge members whereby an upward swinging movement of the fence will simultaneously move the fence outwardly on said hinge members.

3. A child's car seat, having in combination, a back portion, a pair of hooks for suspending the car seat secured to the back portion, a seat portion hinged to the back portion, a device for locking the seat in an opened-out operative position comprising a latch member having a cam riser and at the end thereof a stop surface, and a spring pressed locking member, said latch member and spring pressed locking member being mounted in cooperating relation on the back portion and on the seat portion so that when the seat portion is swung to an opened out operative position the spring pressed locking member engages against said cam surface, and thereafter moves into locking relation with said stop surface, a U-shaped fence consisting of a transverse element and rearward extensions therefrom, a pair of hinge members mounted on the back portion and connected in telescoping relation with said rearward extensions of the fence, and a pair of links connected between said U-shaped fence and the back portion, said links having a pivotal connection with the back portion substantially above said telescoping hinge members whereby an upward swinging movement of the fence will simultaneously move the fence slidably outwardly on said hinge members.

4. A child's car seat having, in combination, a back portion, a pair of upright members forming the lateral edges of said back portion and having formed therein vertically extending slots, a pair of brackets vertically adjustable in said slots, a pair of hooks swivelly supported from said brackets for movement between rearward operative position and a lateral folding position, a U-shaped fence having a cross bar and rearwardly extending tubular extensions, hinge members pivotally supported from the back portion and arranged to extend within said tubular extensions in telescoping relation thereto, and a pair of links connected between said U-shaped fence and back portion, said links having a pivotal connection with the back portion substantially above the pivots of said hinge members whereby an upward swinging movement of the fence will simultaneously move the fence outwardly on said hinge members.

5. A child's car seat having, in combination, a back portion, a seat portion mounted from the back portion, supporting means on which the child's car seat is carried in position for use, a U-shaped fence having a cross bar and rearwardly extending extensions, hinge members pivotally supported from the back portion, said extensions being carried by said hinge members, the latter providing a guide for an outward and upward swinging movement of the U-shaped fence, and a pair of links pivotally connected between said U-shaped fence and the back portion, the pivotal connection of said links with the back portion located above the pivots of said hinge members so that an upward swinging movement of the fence will move said links and extensions into a straightened relation and thereby simultaneously will move the cross bar outwardly and up with relation to the pivotal connection of the links with the back portion.

References Cited in the file of this patent

UNITED STATES PATENTS

| | | |
|---|---|---|
| 2,382,953 | Baxter | Aug. 21, 1945 |
| 2,498,736 | Freund | Feb. 28, 1950 |
| 2,508,822 | Goldberg | May 23, 1950 |
| 2,533,527 | Soltis | Dec. 12, 1950 |
| 2,723,709 | Welsh | Nov. 15, 1955 |

FOREIGN PATENTS

| | | |
|---|---|---|
| 11,469 | Great Britain | 1907 |